United States Patent
Daniel et al.

(10) Patent No.: US 10,021,131 B2
(45) Date of Patent: Jul. 10, 2018

(54) ORIGIN CONTROLLED ATTACK PROTECTIONS IN A DISTRIBUTED PLATFORM

(71) Applicant: Verizon Digital Media Services Inc., Playa Vista, CA (US)

(72) Inventors: Alexander Michael Daniel, Los Angeles, CA (US); Tin Zaw, Los Angeles, CA (US); Thomas Handley, Los Angeles, CA (US)

(73) Assignee: Verizon Digital Media Services Inc., Los Angeles, CA (US)

( * ) Notice: Subject to any disclaimer, the term of this patent is extended or adjusted under 35 U.S.C. 154(b) by 197 days.

(21) Appl. No.: 15/043,929

(22) Filed: Feb. 15, 2016

(65) Prior Publication Data
US 2017/0237768 A1    Aug. 17, 2017

(51) Int. Cl.
*H04L 29/06* (2006.01)
*G06F 21/10* (2013.01)

(52) U.S. Cl.
CPC ......... *H04L 63/1458* (2013.01); *G06F 21/10* (2013.01); *H04L 63/1416* (2013.01); *H04L 63/1433* (2013.01)

(58) Field of Classification Search
None
See application file for complete search history.

(56) References Cited

U.S. PATENT DOCUMENTS

| 8,613,089 B1 * | 12/2013 | Holloway | ........... H04L 63/1458 709/217 |
| 9,253,206 B1 * | 2/2016 | Fleischman | ......... H04L 63/1458 |
| 9,641,549 B2 * | 5/2017 | Holloway | ........... H04L 63/1458 |
| 9,661,020 B2 * | 5/2017 | Holloway | ........... H04L 63/1458 |
| 9,825,928 B2 * | 11/2017 | Lelcuk | .................... H04L 63/08 |

(Continued)

OTHER PUBLICATIONS

Lazri, Kahina; Laniepce, Sylvie; Zheng, Haiming; Ben-Othman, Jalel. AMAD: Resource Consumption Profile-Aware Attack Detection in IaaS Cloud. 2014 IEEE/ACM 7th International Conference on Utility and Cloud Computing (UCC). Pub. Date: 2014. http://ieeexplore.ieee.org/stamp/stamp.jsp?tp=&arnumber=7027515.*

(Continued)

*Primary Examiner* — Jeremiah Avery
(74) *Attorney, Agent, or Firm* — Los Angeles Patent Group; Arman Katiraei

(57) ABSTRACT

Some embodiments provide an origin whose content is distributed by a third party content distributor control over invoking attack protections from the third party content distributor. The origin independently monitors requests and messaging the content distributor passes to the origin as a result of the content distributor needing to retrieve content from the origin before redistribution or because requested content is dynamic or uncacheable. Upon detection of an attack, the origin signals the content distributor to perform one of several attack protections on its behalf. In this manner, the origin leverages the content distributor distributed platform architecture to shield itself from attack. Based on the origin signaling, the content distributor rate limits, blocks, redirects, or performs other attack protections to reduce the load on the origin server.

20 Claims, 5 Drawing Sheets

(56) References Cited

U.S. PATENT DOCUMENTS

| | | | |
|---|---|---|---|
| 2005/0018618 A1* | 1/2005 | Mualem | H04L 63/1458 370/252 |
| 2007/0121596 A1* | 5/2007 | Kurapati | H04L 29/06027 370/356 |
| 2011/0055921 A1* | 3/2011 | Narayanaswamy | H04L 63/1458 726/22 |
| 2011/0066841 A1* | 3/2011 | Goodrow | H04L 43/0894 713/150 |
| 2014/0095887 A1* | 4/2014 | Nayshtut | G06F 21/57 713/189 |
| 2014/0289854 A1* | 9/2014 | Mahvi | H04L 63/1416 726/23 |
| 2014/0317738 A1* | 10/2014 | Be'ery | H04L 63/14 726/23 |
| 2016/0381048 A1* | 12/2016 | Zhao | H04L 63/1416 726/23 |

OTHER PUBLICATIONS

Rocha, Eduardo; Salvador, Paulo; Nogueira, Antonio. Detection of Illicit Traffic based on Multiscale Analysis. 17th International Conference on Software, Telecommunications & Computer Networks, 2009. SoftCOM 2009. Pub. Date: 2009. http://ieeexplore.ieee.org/stamp/stamp.jsp?tp=&arnumber=5306872.*

* cited by examiner

ORIGIN CONTROLLED ATTACK PROTECTIONS IN A DISTRIBUTED PLATFORM

BACKGROUND ART

A content distributor operates and manages a distributed platform. Using the distributed platform, the content distributor delivers content and services generated by and sourced from different origins to thousands of different end users using the distributed platform. The distributed platform is typically comprised of a set of servers located at different points throughout the Internet. Content delivery networks, cloud operators, and proxies are some examples of content distributors that operate a distributed platform.

Origins rely on the content distributor's distributed platform for delivery of their content and services because the distributed platform offers origins scalability, accelerated delivery, and security while removing the infrastructure management overhead from the origins. The distributor provisions, configures, and deploys additional server resources as demand for different origin content and services increases or changes. The distributor also accelerates content and service delivery to end users by virtue of placing its servers at different locations. End user requests and the content and services sent in response to those requests are received and delivered from the distributed platform servers that are closest to the requesting end user. This accelerates delivery of the origin content and services by reducing the number of network hop traversals for submitting the requests, content, and services to an intended destination. The distributed platform servers also provide security for the origins. The distributed platform servers act as the front line of defense against network launched attacks directed to content and services of the origins. Any request or message that is part of an attack directed to content and services of an origin will arrive at one of the distributed platform servers before any of the origin's own servers. The distributed platform servers can perform various attack protections on behalf of the origin to protect the origin servers.

Rate limiting is one attack protection the distributed platform can perform on behalf of an origin. Rate limiting is effective in shielding an origin from a distributed denial of service (DDoS) attack. As part of rate limiting, the distributed platform servers monitor request rates for different provider content and services. The distributed platform servers can monitor the request rates individually on a server-by-server basis, on an aggregate basis, or some combination of both. When the request rate for particular content exceeds a distributed platform configured threshold, the distributed platform servers can take ameliorative action to limit or reduce the rate of requests directed to the particular content. One such ameliorative action involves sending a computationally expensive problem (i.e., a hashcache problem) in response to end user requests directed to the particular content. Requests with a correct answer to the problem will then be processed by the distributed platform servers, while requests without the correct answer will be ignored, dropped, or responded to with another problem.

The above approach and other similar approaches with which the content distributor or distributed platform triggers the attack protections on behalf of an origin are limited. The distributed platform detects an attack and invokes attack protections based on what happens at the distributed platform level. The distributed platform however, does not account for loads on the origin or the servers under origin control (i.e., origin servers). More generally, the origins are not integrated as part of the distributed platform, thereby leaving attack detection and attack protections under distributed platform control. This prevents the origins from being able to take action when they perceive a threat independent of the criteria or thresholds put in place by the distributed platform. This is especially problematic for dynamic or uncacheable content, because the distributed platform servers typically forward all such requests to the origin servers. Due to the scale of the distributed platform, the distributed platform servers are able to handle much greater loads than the origin servers. Accordingly, the distributed platform servers may invoke attack protections after the load on the origin servers becomes excessive. Also, since the origin is a central point at which all user requests for the origin content may be funneled, the origin may have additional information from which to detect an attack that different distributed platform servers receiving subsets of the requests cannot. The origin may also use different criteria than the distributed platform or proprietary methods to detect attacks.

The origin can implement its own attack protections at the origin servers. This however would duplicate functionality already available at the distributed platform level and would shift the security burden back to the origin, eliminating a significant reason behind the origin's usage of the distributed platform.

Accordingly, there is a need to create better synergy between origins and the third party distributed platform that delivers and protects the content and services of the origins. More specifically, there is a need to extend security controls from the distributed platform to the origins so that origins can leverage the distributed platform attack protections without having to replicate.

BRIEF DESCRIPTION OF THE DRAWINGS

A preferred embodiment of methods and systems for origin controlled attack protections in a distributed platform will now be described, by way of example only, with reference to the accompanying drawings in which.

DETAILED DESCRIPTION

Some embodiments provide origin controlled attack protections in a distributed platform. The embodiments allow an origin to detect attacks independent of any monitoring and detection performed by the distributed platform. Moreover, the embodiments allow the origin to invoke attack protections performed by the distributed platform in order to shield the origin against any attacks detected by the origin or the distributed platform. In other words, the embodiments allow any origin to incorporate their own attack detection techniques with those of the distributed platform without the origin having to implement its own attack protections.

Figure 1:
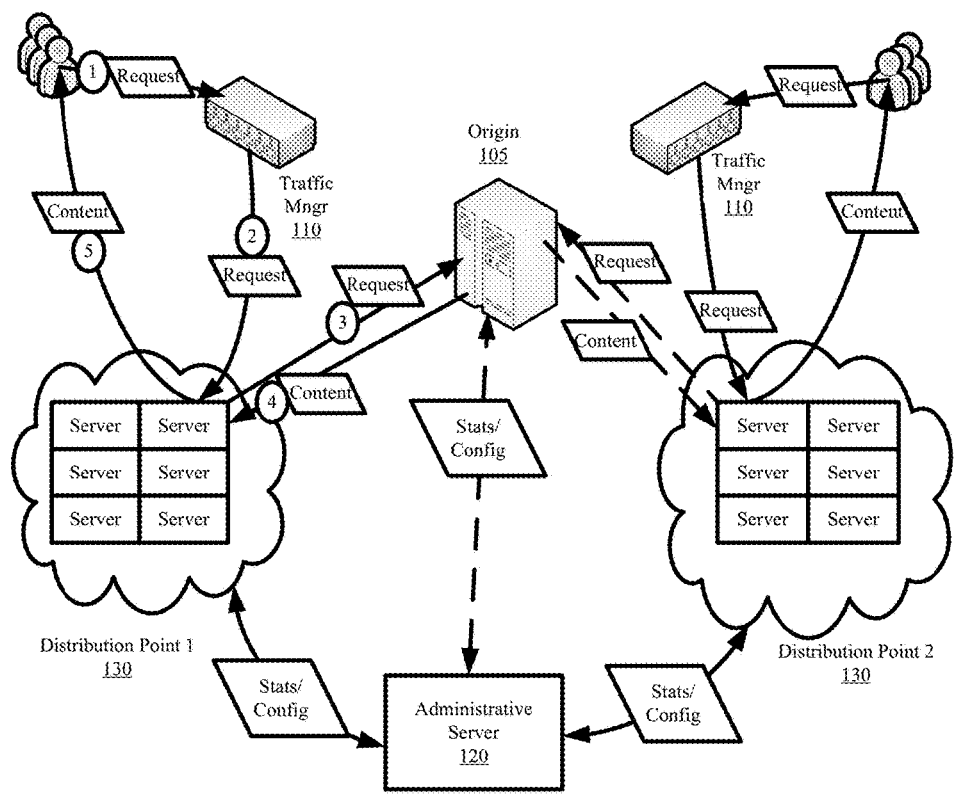
FIG. 1 presents an exemplary architecture for implementing the origin controlled attack protections in accordance with some embodiments.

FIG. 1 presents an exemplary architecture for implementing the origin controlled attack protections in accordance with some embodiments. FIG. 1 illustrates an origin 105 that leverages a distributed platform for content or service delivery and security. Specifically, the distributed platform retrieves and fans out the origin's 105 content or services to different end users spread across the Internet in an optimized manner. Moreover, the distributed platform provides a defensive layer that shields the origin 105 from attacks directed to the origin's 105 content or services.

The distributed platform includes traffic management servers 110, an administrative server 120, and distribution points 130. The distributed platform architecture is representative of a content delivery network (CDN), cloud service provider, a distributed proxy, or other operator of a distributed set of servers.

The traffic management servers 110 route end users, and more specifically, end user issued requests for services or content to one of the distribution points 130 that can optimally deliver the requested service or content back to the requesting end user. Different implementations utilize different traffic management schemes, such as Anycast routing or Domain Name System (DNS) routing. The traffic management server 110 operation can also provide failover and redundancy.

The administrative server 120 may include a central server of the distributed platform or a distributed set of interoperating servers that perform the configuration control and reporting function of the distributed platform. The origin 105 registers with the administrative server 120 in order to designate and offload its services and content to the distributed platform for distribution through the distribution points 130. In some embodiments, the designation includes identifying one or more origin servers from which the distribution point 130 servers source and distribute the origin's services or content.

The distribution points 130 are usually geographically separated from one another and located at different edges of the Internet or other large network infrastructure. Each distribution point 130 includes one or more servers and may further include other machines such as load balancers (not shown).

Each distribution point 130 server can represent a separate physical machine or a set of virtual machines running on a partitioned or shared set of resources of a physical machine. Multiple servers may be deployed onto the hardware resources of a single physical machine. The distribution point 130 servers perform at least two tasks on behalf of the origin 105.

First, the distribution point 130 servers provide distributed and accelerated delivery of the origin's 105 services and/or content. The distribution point 130 servers typically have a cache into which they will attempt to store copies of the origin 105 content and services so that the content and services can be sent in response to user requests without having to source the content or services from the origin 105 for each request. Caching may not be possible when the origin content or services involves dynamic or other uncacheable content.

Second, the distribution point 130 servers implement different attack protections to shield the origin 105 from attacks. The attack protections implemented by the distributed platform protect the origin 105 from a variety of network based attacks. As one example, the attack protections include using the distribution point 130 servers to limit the rate of requests directed to the origin's content or services, thereby reducing the total number of requests the origin 105 has to process. Other attack protections including redirection, black-holing, connection terminating, etc. can also be performed by the distribution point 130 servers to protect the origin 105 from different distributed denial of service (DDoS) attacks and other application layer or layer 7 attacks.

To perform the above two tasks, the distribution point 130 servers are configured to receive any end user requests that are directed to the origin's 105 content or services before the origin's 105 own servers (i.e., origin servers). This can be accomplished with a Domain Name System (DNS) change, redirection, or forwarding. The DNS change causes requests directed to the origin's content or services to be routed to the distributed platform domain or traffic management servers 110 which then route the requests to different distribution point 130 servers rather than the origin servers.

In response to an initial request for particular content of the origin 105, a distribution point server receiving the request establishes a connection to the origin server operated by the origin 105. The distribution point server retrieves a copy of the requested content from the origin sever over the established connection. The distribution point server then passes the retrieved content to the requesting end user and, if possible, locally caches a copy so that subsequent requests for the same content can be served from cache without accessing the origin server.

As noted above, certain dynamic or custom content or services cannot be cached and each request for such content or services may trigger a retrieval back to the origin server. In some embodiments, the distribution point 130 server forwards each such user request to the origin 105. Rather than forward the user's original request, the distribution point 130 may pass its own generated request to the origin 105 in order to retrieve the requested content on behalf of the user. Attacks directed to uncacheable dynamic or custom origin 105 content or services are especially problematic. These attacks can quickly overwhelm the origin servers due to the lesser loads the origin servers can sustain relative to the distribution points 130. Moreover, the distribution points 130 may be unable to detect a distributed attack that harms the origin server, because different subsets of attack messages can arrive at the different distribution points 130 without triggering any attack thresholds at any individual distribution point and the distribution points 130 funnel all attack messaging back to the origin server such that the attack is concentrated on the origin server. In other words, if an attack goes undetected through the distributed platform to the origin 105, the origin 105 currently has no recourse to defend itself as it is dependent on the distribution protection for attack protection.

The embodiments address such issues by providing the origin 105 controls for invoking the distributed platform attack protections independent of any triggers or thresholds used by the distributed platform. As a result, the origin 105 can perform its own attack detection independent of the attack monitoring and detection provided by any one or more of the distribution point 130 servers, while still leveraging the distributed platform architecture to shield and protect the origin 105 from attack. By leveraging the distributed platform's architecture to implement attack protections, the origin 105 avoids implementing a redundant layer of attack protections at the origin level for protecting against attacks that go undetected by the distributed platform, but that are detected by the origin 105.

Figure 2:
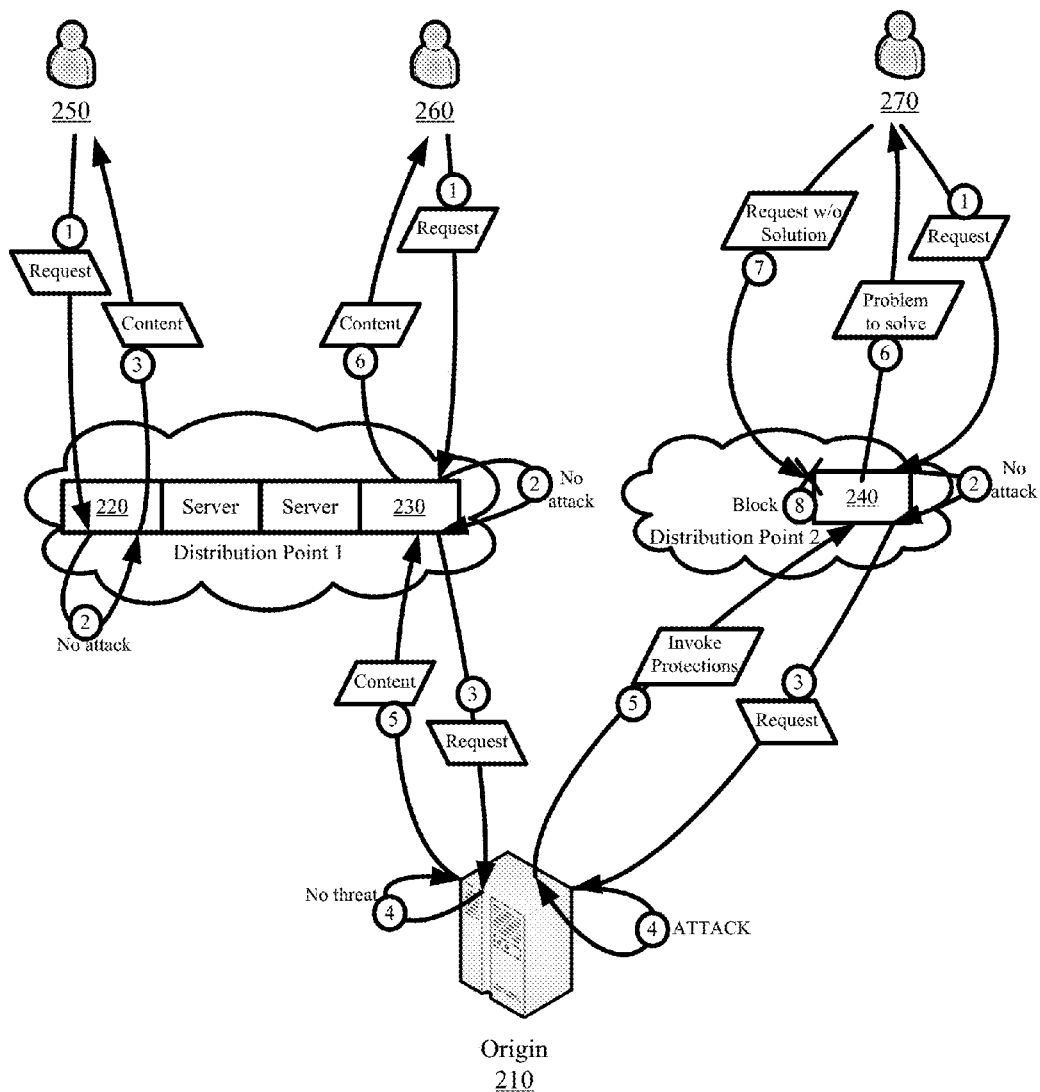
FIG. 2 conceptually illustrates an origin controlling distributed platform attack protections in accordance with some embodiments.

FIG. 2 conceptually illustrates an origin controlling distributed platform attack protections in accordance with some embodiments. The figure illustrates an origin server 210 where origin generated content is made available for redistribution to users across the Internet by different distributed platform servers 220, 230, and 240 of a third party content distributor operating in different distribution points.

A first user 250 submits a first request for origin content to a first distributed platform server 220. The first distributed platform server 220 inspects the first request against distributed platform configured attack thresholds and determines that the first request is not part of an attack. The first distributed platform server 220 has the requested origin content cached and is therefore able to respond to the request without accessing the origin server 210.

A second user submits 260 a second request for origin content to a second distributed platform sever 230. The second distributed platform server 230 inspects the second request against the distributed platform configured attack thresholds and determines that the second request is also not part of an attack. The second distributed platform server 230 does not have the requested content cached. Accordingly, the second distributed platform server 230 passes the user request or a similar distributed platform server generated request to the origin server 210. The origin server 210 inspects the request and determines that the request does not trigger any origin defined attack detection thresholds. The origin server 210 therefore sends the requested content to the second distributed platform server 230 which then forwards the content back to the second user 260.

A third user 270 submits a third request for origin content to a third distributed platform server 240. The third distributed platform server 240 inspects the third request to determine that the request is not part of an attack. The third distributed platform server 240 does not have the requested content cached and passes the request to the origin server 210. The origin server 210 then performs its own inspection of the request. In this instance, the third request, either alone or in combination with the second request received by the origin server 210, triggers an attack detection threshold of the origin server 210. Accordingly, the origin server 210 invokes attack protections of the distributed platform. In particular, the origin server 210 signals the third distributed platform server 270 to perform a specific attack protection on behalf of the origin server 210. In this case, the invoked attack protection causes the third distributed platform server 270 to perform rate limiting for some duration specified within the origin server's attack protection invocation signaling. Therefore, in response to the third request, the third distributed platform server 270 sends a computational problem to the user 270.

The user must then verify that it is a legitimate user by resending the third request with the correct solution to the problem. If the correct solution is not provided, the third distributed platform server 270 blocks or drops subsequently issued requests or sends different problems back to the requesting user, thereby shielding the origin server 210 from illegitimate requests.

Should the requesting user resubmit the request with the correct problem solution, the third distributed platform server 270 will forward the request to the origin server 210 with a flag indicating that the request is from a legitimate user. The flag can be set in the request header. The flag indicates that the distributed platform has verified the request using the origin invoked attack protection. In response to the request, the origin server 210 sends the requested content to the third distributed platform server 270 for redistribution to the user.

Figure 3:
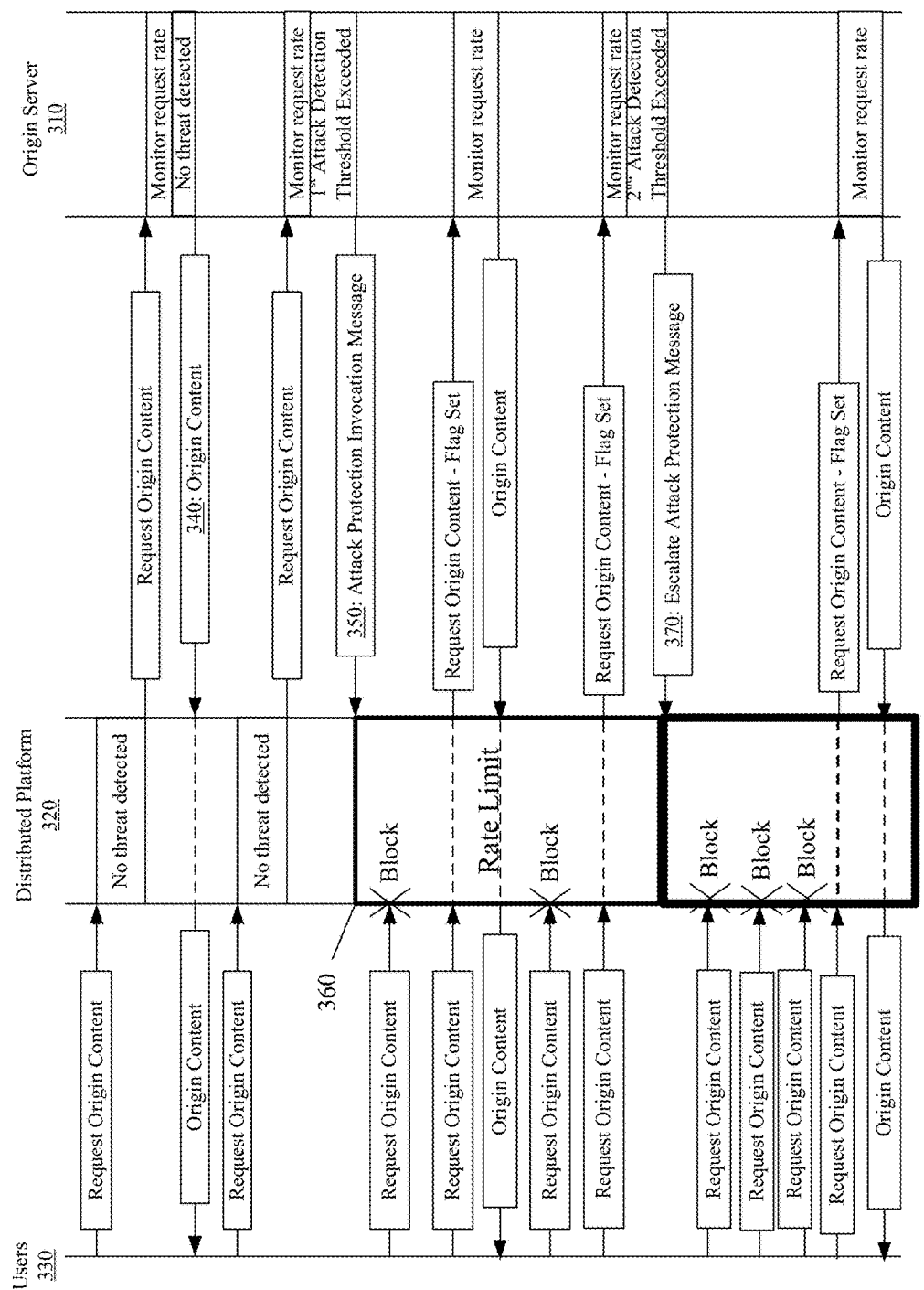
FIG. 3 presents a message diagram illustrating a distributed platform performing attack protections to alternatively limit the rate of requests that arrive at an origin in response to the origin invoking the attack protections of the distributed platform.

FIG. 3 presents a message diagram illustrating a distributed platform performing attack protections to alternatively limit the rate of requests that arrive at an origin in response to the origin invoking the attack protections of the distributed platform. The figure illustrates an origin server 310, the distributed platform 320, and users 330. The distributed platform 320 represents multiple content distribution servers operating in different distribution points.

The message diagram starts with the users 330 rapidly submitting multiple requests for origin generated dynamic content to the distributed platform 320. The requests are disbursed across the different distribution points. The distributed platform 320 therefore does not detect any threat and forwards the requests to the origin server 310. The rate of requests at the origin server 310 does however violate a first attack detection threshold of the origin server 310. Accordingly, after responding (at 340) to a first request with the requested content, the origin server 310 sends (at 350) an attack protection invocation message to the distributed platform 320 in response to a second issued request.

In some embodiments, the distributed platform 320 propagates the attack protection invocation message across its different distribution points so that the requested attack protection is implemented throughout the distributed platform. In this figure, the distributed platform 320 limits (at 360) request rates by dropping every other incoming request so that half of the requests are passed to the origin server 310 during a particular interval in which the attack protections are performed by the distributed platform 320. The distributed platform 320 can set a flag in each request that is passed to the origin server 310 to notify the origin server 310 that the distributed platform has screened the request with a requested attack protection.

The attack protections initially invoked by the origin server 310 and performed at 360 by the distributed platform 320 do not provide sufficient protection for the origin server 310. Specifically, the rate of requests arriving at the origin server 310 now exceed a second attack detection threshold of the origin server 310. Accordingly, the origin server 310 escalates the attack protections by sending (at 370) additional signaling to the distributed platform 320. The signaling notifies the distributed platform 320 to further limit the request rate to the origin server 310. In response, the distributed platform begins blocking three out of every four requests to the origin server 310.

As can be seen from the above figures, the origin uses its own thresholds or criteria to independently detect attacks based on requests that the distributed platform servers operating in the different distribution points send to the origin's own servers. The requests provide the origin insight that the individual distributed platform servers or distribution points do not have. In particular, the requests provide the origin with global request insight, whereas each distribution point of the distributed platform has regional request insight.

The origin server attack detection is based on configuring one or more origin servers to perform request or message monitoring and analysis. The monitoring and analysis involves inspecting designated fields or parameters of requests or other messaging received from the distributed platform. The monitoring and analysis can also involve tracking rates as well as other measurable metrics of the received requests or messaging. The monitoring and analysis proceeds according to a custom set of thresholds or criteria defined by the origin independent of any thresholds or criteria that are defined at the distributed platform level. In other words, the origin configured thresholds and criteria differ from the thresholds and criteria that the distributed platform uses to detect attacks. The thresholds or criteria determine exactly the fields or metrics the origin server inspects in determining the commencement of different attacks against the origin. Each threshold can be paired with an attack protection. If the threshold is triggered while monitoring, the origin server would then signal the distributed platform to perform the attack protection that is paired with that threshold. Different attack protections can be paired with different thresholds so that the origin server can control escalating and deescalating attack protections as needed.

In some embodiments, the origin thresholds and criteria can be defined to detect attacks using any header field from received requests or messages from the distributed platform. The address field from the request header can be used to detect and protect against attacks originating from a specific Internet Protocol (IP) address or from some specific subset of IP addresses (e.g., an IP address subnet). When the IP address field is defined in conjunction with a request rate, the origin server monitors request rates from different IP addresses in order to determine if one or more IP addresses are sending excessive amounts of traffic that are indicative of a DDoS attack. In some cases, the distributed platform does not forward user requests to the origin server, but a modified request that is generated by the distributed platform server. In such cases, the origin server can still request attack protections from a particular user, by sending an attack protection invocation message to a distributed platform server. The distributed platform server then determines the user request the invocation message was sent in response to and begins performing the attack protection against that user for some period of time. The user agent field from the request header can be used to detect and protect against attacks originating from specific devices or device types. The presence or absence of a cookie in the request header can also be used to detect and protect against different attacks. In this manner, the origin can set different request rate thresholds to trigger attack protections based on a total number of received requests, a total number of received requests directed to particular content, or a total number of received requests from one or more users as some examples.

As part of invoking the distributed platform attack protections, the origin server can signal one or more specific attack protections for the distributed platform to perform. In some embodiments, the different rate limiting protections that the origin can invoke and the distributed platform can perform on behalf of the origin include: (1) redirecting first issued user requests and processing second issued user requests, (2) dropping first issued user requests and processing second issued user requests, (3) issuing a computationally expensive problem in response to requests that do not provide a correct problem solution, and (4) terminating an initial connection established between a user and a distributed platform server. Other attack protections that the origin server can request from the distributed platform include blocking or black-holing specific requests or requests from specific users.

The origin server can also specify a specific subset of requests that the distributed platform performed attack protections apply to. In some embodiments, the origin server can restrict the attack protections to one or more IP addresses, user devices, geographic regions, specific content or services, content or service types, and any other parameter that can be identified from request headers.

In some embodiments, the attack protection invocation signaling from the origin server to the distributed platform can also specify the duration and range of the invoked attack protections. The duration specifies an amount of time or a condition that if satisfied would cause the distributed platform to stop performing the origin invoked attack protections. For example, the origin server can specify cessation of the attack protections when the request rate for requests targeting origin content or services falls below a specified rate. The condition for the duration can also be used to escalate attack protections. An origin server may request that a first attack protection be performed if request rates for origin content at the distributed platform servers are within a first threshold and that a more restrictive second attack protection be performed if the request rates are not reduced after the distributed platform performs the first attack protection for some amount of time. The range parameter specifies which distribution points are to implement the origin invoked attack protections. For an isolated attack, the origin, by way of the attack protection invocation signaling, can request that a particular distribution point server or all servers of a particular distribution point of the distributed platform perform attack protections on behalf of the origin. For a widespread attack, the origin, by way of the attack protection invocation signaling, can request that all distribution point servers of the distributed platform perform attack protections on behalf of the origin.

Figure 4:
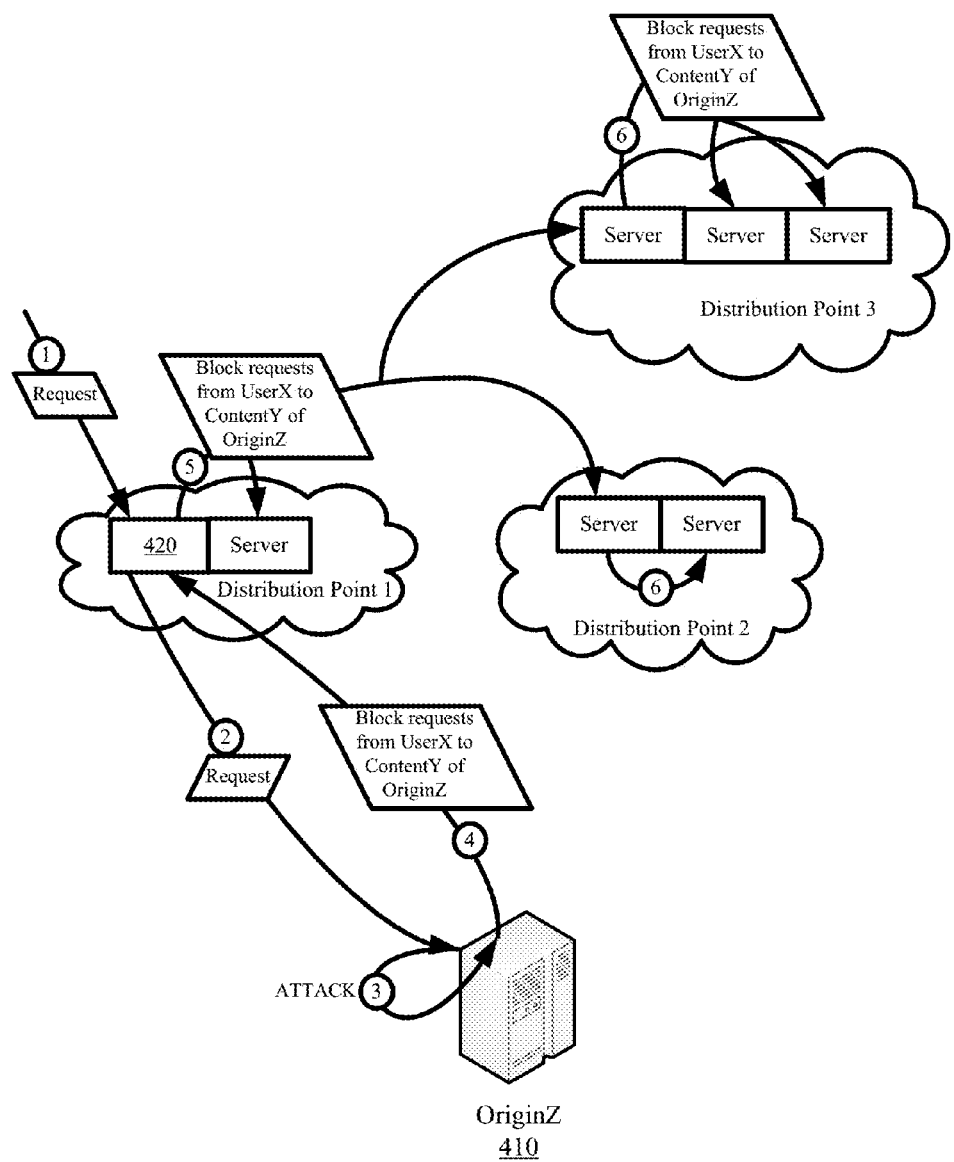
FIG. 4 illustrates an origin invoking attack protections across different distribution points of the distributed platform in accordance with some embodiments.

FIG. 4 illustrates an origin invoking attack protections across different distribution points of the distributed platform in accordance with some embodiments. The origin 410 receives a request or other message from a particular distribution point server 420. The origin 410 detects an attack based on the received request or message. In other words, the received request triggers an attack protection threshold of the origin 410.

The origin 410 responds by sending an attack protection invocation message to the particular distribution point server 420. The attack protection invocation message includes a parameter for the range of the attack protections. In this example, the origin 410 requests attack protections from the entire distributed platform. Accordingly, the particular distribution point server 420 passes the attack protection invocation message to the other distribution points. In some embodiments, each distribution point has at least one server designated to receive the attack protection invocation messages and to distribute the messages to other servers within the same distribution point. Once the message propagates across the distributed platform, all distributed platform servers perform the attack protections identified within the invocation message, thereby shielding the origin from any subsequent requests or messaging that are directed to the origin and that fall within the parameters of the invoked attack protections.

It should be noted that because the distributed platform servers provide content delivery and security for different origins, the attack protections invoked by a particular origin will be effectuated against requests or messaging directed to the particular origin's content or services and not content or services of other origins. Therefore, upon receiving an attack protection invocation message, a distributed platform server will change its configuration to designate what domain, content, services, or origin the attack protection specified in the message apply to.

In some embodiments, the origin controls invocation of the distributed platform attack protections by adapting HyperText Transfer Protocol (HTTP) messaging. In particular, some embodiments adapt the HTTP 429 message for origin controlled attack protection invocation. The HTTP 429 message is an HTTP message with a status code indicating that a user has sent too many requests in a given amount of time. In some embodiments, the HTTP 429 message is modified to include parameters with which the origin can specify which users to restrict, the attack protections to invoke, and the duration and range of the attack protections as some examples. The parameters can be included within extension header fields. An exemplary attack protection invocation message from an origin to an distribution point server of a distributed platform can be defined:

```
HTTP/1.1 429 Too Many Requests
Content-Type: text/html
Retry-After: 300
<html> <head><title>Too Many Requests</title></head>
<body><h1>Too Many Requests</h1>
<p>restrict:address111.222.333.XXX;
protection:rate-limiting+hashcache:level3;
range:all</p></body></html>
```

The exemplary attack protection invocation message above requests attack protections against request or messaging originating from the IP address block 111.222.333.xxx. The invoked attack protections include rate limiting using a computational expensive hashcache problem across the entire distributed platform for a 300 second duration.

In some embodiments, the origin servers issue a standard HTTP 429 message without any parameters. The receiving distributed platform server identifies the particular user request that the 429 message was sent in response to and automatically performs attack protections against the particular user (i.e., IP address) for a specified duration. It should be noted that messaging other than the HTTP 429 message can be used to signal attack protection invocation and that usage of the HTTP 429 provided for exemplary purposes.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 5:
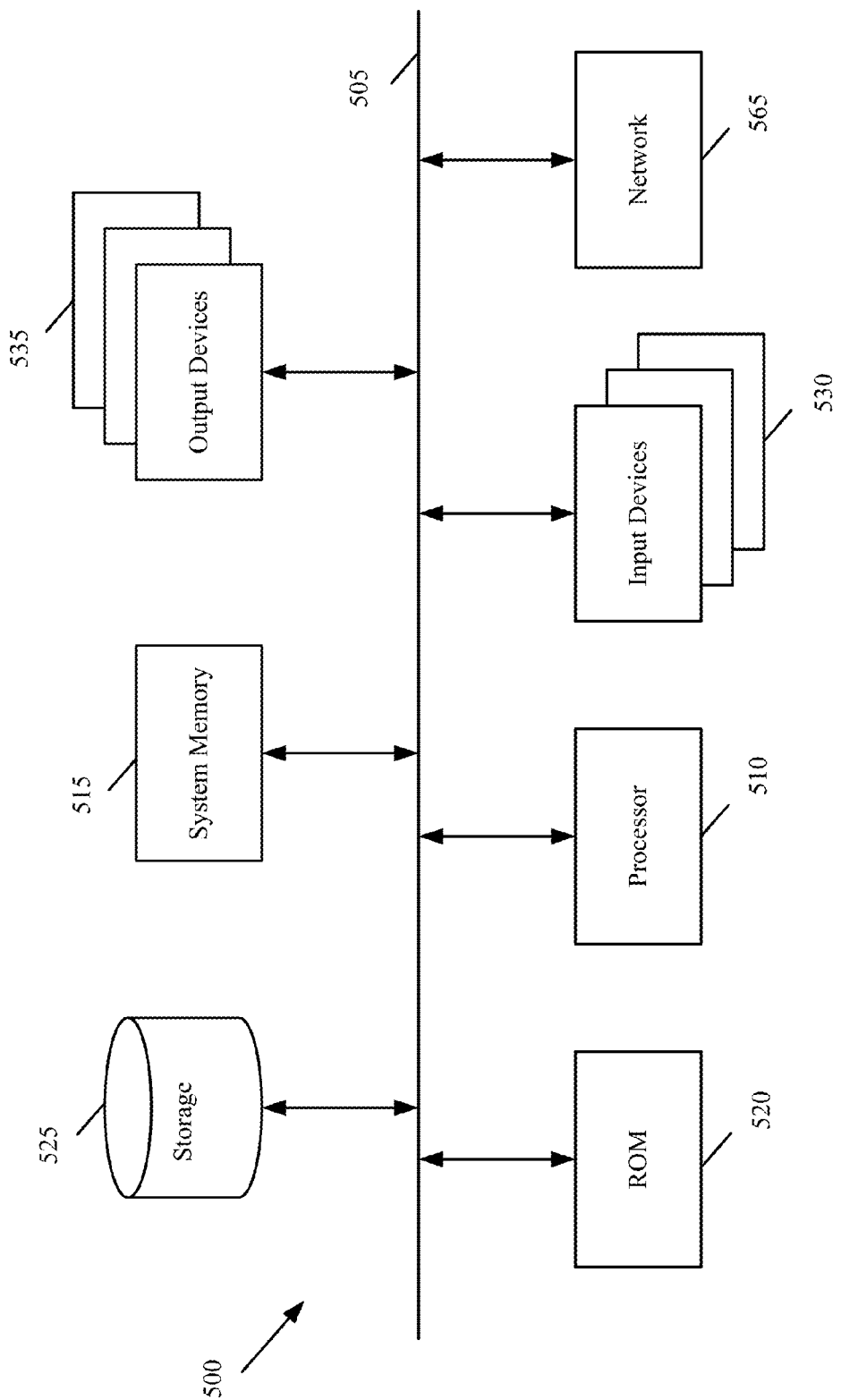
FIG. 5 illustrates a computer system or server with which some embodiments are implemented.

FIG. 5 illustrates a computer system or server with which some embodiments are implemented. Such a computer system includes various types of computer-readable mediums and interfaces for various other types of computer-readable mediums that implement the various methods and machines described above (e.g., distributed platform server or origin server). Computer system 500 includes a bus 505, a processor 510, a system memory 515, a read-only memory 520, a permanent storage device 525, input devices 530, and output devices 535.

The bus 505 collectively represents all system, peripheral, and chipset buses that communicatively connect the numerous internal devices of the computer system 500. For instance, the bus 505 communicatively connects the processor 510 with the read-only memory 520, the system memory 515, and the permanent storage device 525. From these various memory units, the processor 510 retrieves instructions to execute and data to process in order to execute the processes of the invention. The processor 510 is a processing device such as a central processing unit, integrated circuit, graphical processing unit, etc.

The read-only-memory (ROM) 520 stores static data and instructions that are needed by the processor 510 and other modules of the computer system. The permanent storage device 525, on the other hand, is a read-and-write memory device. This device is a non-volatile memory unit that stores instructions and data even when the computer system 500 is off. Some embodiments of the invention use a mass-storage device (such as a magnetic or optical disk and its corresponding disk drive) as the permanent storage device 525.

Other embodiments use a removable storage device (such as a flash drive) as the permanent storage device Like the permanent storage device 525, the system memory 515 is a read-and-write memory device. However, unlike storage device 525, the system memory is a volatile read-and-write memory, such as random access memory (RAM). The system memory stores some of the instructions and data that the processor needs at runtime. In some embodiments, the processes are stored in the system memory 515, the permanent storage device 525, and/or the read-only memory 520.

The bus 505 also connects to the input and output devices 530 and 535. The input devices enable the user to communicate information and select commands to the computer system. The input devices 530 include alphanumeric keypads (including physical keyboards and touchscreen keyboards), pointing devices. The input devices 530 also include audio input devices (e.g., microphones, MIDI musical instruments, etc.). The output devices 535 display images generated by the computer system. The output devices include printers and display devices, such as cathode ray tubes (CRT) or liquid crystal displays (LCD).

Finally, as shown in FIG. 5, bus 505 also couples computer 500 to a network 565 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 500 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for providing an origin server control over attack protections provided by a third-party redistributing content from the origin server, the method comprising:
   providing a distributed platform comprising a plurality of content distribution servers redistributing content of a content provider from the origin server, wherein the origin server is operated by the content provider independent of the distributed platform and said plurality of content distribution servers;
   receiving over a digital network across the plurality of content distribution servers of the distributed platform, a plurality of requests directed to the content of the content provider;
   issuing first and second requests of the plurality of requests from at least one particular content distribution sever of the plurality of content distribution servers to the origin server in response to the at least one particular content distribution server not caching a copy of the content;
   sending said content from the particular content distribution server to a requesting user originating the first request based on the origin server returning a first response to the particular content distribution server in reply to said issuing the first request for said content to the origin server;
   performing a first network attack protection against the second request and a first set of the plurality of requests at the particular content distribution server based on the origin server returning a different second response to the particular content distribution server in reply to said issuing the second request for said content to the origin server, wherein the first response comprises said content and the second response comprises an attack protection invocation message.

2. The method of claim 1 further comprising receiving the attack protection invocation message from the origin server at the particular content distribution server and distributing the attack protection invocation message from the particular content distribution server to the plurality of content distribution servers.

3. The method of claim 2 further comprising performing the first network attack protection against the first set of requests at each content distribution server of the plurality of content distribution severs in response to said distributing.

4. The method of claim 1 further comprising performing a different second network attack protection against a different second set of the plurality of requests in response to a rate of the second set of requests exceeding a rate of the first set of requests.

5. The method of claim 1, wherein performing the first network attack protection comprises shielding the origin server from the first set of requests.

6. The method of claim 5, wherein performing the first network attack protection further comprises dropping or blocking the first set of requests at the plurality of content distribution servers.

7. The method of claim 5, wherein performing the first network attack protection further comprises rate limiting the first set of requests.

8. The method of claim 7, wherein said rate limiting comprises responding to each request of the first set of requests with a computational problem for a requesting user to solve.

9. The method of claim 8 further comprising sending said content in response to a second set of the plurality of requests comprising a correct solution to the computational problem.

10. The method of claim 1 further comprising inspecting at the plurality of content distribution servers, the first and second requests against content distributor defined attack thresholds.

11. The method of claim 10 further comprising inspecting at the origin server, the first and second requests against content provider defined attack thresholds, wherein the content provider defined attack thresholds are different than the content distributor defined attack thresholds.

12. The method of claim 1, wherein said performing the first network attack protection comprises receiving an HyperText Transfer Protocol (HTTP) message with a particular status code at the particular content distribution server from the origin server in reply to the second request, and activating the first network attack protection on the particular content distribution server in response to the HTTP message with the particular status code from the origin server.

13. The method of claim 12, wherein said performing comprises selecting the first network attack protection from a set of attack protections available at the particular content distribution server based on a parameter from the HTTP message and enforcing the first network attack protection against one or more requesting users based on one or more identifiers identifying said one or more requesting users in the HTTP message.

14. The method of claim 12 further comprising disabling the first network attack protection after said performing for a duration specified in the HTTP message.

15. A method comprising:
   providing a first tier of servers operated by a distributed platform, wherein the first tier of servers distribute content from a second tier server that is independently operated by a content provider leveraging the distributed platform for distribution of the content provider content;
   receiving a content request over a digital network at a particular first tier server of the first tier of servers;
   sending the content request from the particular first tier server to the second tier server as a result of verifying the content request against a first set of attack detection thresholds of the distributed platform enforced by the first tier of servers;
   invoking an attack protection at the particular first tier server as a result of the content request violating one or more of a second set of attack detection thresholds of the content provider enforced by the second tier server, wherein the second set of attack detection thresholds of the content provider differ from the first set of attack detection thresholds of the distributed platform; and
   shielding at the particular first tier server of the distributed platform, the second tier server of the content provider from subsequent content requests received by the particular first tier server in violation of the attack protection.

16. The method of claim 15, wherein invoking the attack protection comprises sending a message over a digital network from the second tier server to the particular first tier server, said message identifying a duration with which the particular first tier server performs the attack protection.

17. The method of claim 16, wherein said message further identifies a particular attack protection from a plurality of attack protections for the particular first tier server to perform.

18. The method of claim 15 further comprising shielding at the first tier of servers, the second tier server from subsequent content requests received by any server of the first tier of servers in violation of the attack protection in response to the particular first tier server invoking said attack protection.

19. The method of claim 15 further comprising sending a set of content requests from the first tier of servers to the second tier server as a result of the set of content requests not triggering the first set of attack detection thresholds at any server of the first tier of servers.

20. The method of claim 19 further comprising monitoring at the second tier server, a rate at which the second tier server receives content requests from the first tier of servers, and wherein the second set of attack detection thresholds trigger at a particular request rate.

* * * * *